United States Patent
Ben-Yehoshua

(10) Patent No.: US 12,298,871 B2
(45) Date of Patent: May 13, 2025

(54) CELLULAR-TO-USB AND CELLULAR-TO-DISPLAYPORT SW MITIGATION

(71) Applicant: Apple Inc., Cupertino, CA (US)

(72) Inventor: Lior Ben-Yehoshua, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 18/465,242

(22) Filed: Sep. 12, 2023

(65) Prior Publication Data

US 2025/0086077 A1    Mar. 13, 2025

(51) Int. Cl.
*H04L 1/00* (2006.01)
*G06F 11/22* (2006.01)
*G06F 13/38* (2006.01)

(52) U.S. Cl.
CPC .......... *G06F 11/221* (2013.01); *G06F 13/385* (2013.01); *H04L 1/0001* (2013.01); *G06F 2213/0042* (2013.01)

(58) Field of Classification Search
CPC .... H04L 1/0001; G06F 11/221; G06F 13/385; G06F 2213/0042
See application file for complete search history.

(56) References Cited

U.S. PATENT DOCUMENTS

| | | | |
|---|---|---|---|
| 9,107,172 B1* | 8/2015 | Epstein | H04B 1/1027 |
| 10,169,286 B2* | 1/2019 | Hundal | G06F 13/4282 |
| 10,331,611 B2* | 6/2019 | Hundal | G06F 13/4282 |
| 11,122,408 B1* | 9/2021 | Mravca | H04W 4/80 |
| 2011/0044376 A1* | 2/2011 | Lin | H04L 1/0606 455/69 |
| 2014/0149611 A1* | 5/2014 | Huang | H04L 1/0002 710/33 |
| 2014/0211640 A1* | 7/2014 | Tahir | H04W 24/10 370/252 |
| 2016/0112711 A1* | 4/2016 | Hundal | G06F 13/4282 375/240.26 |
| 2017/0017595 A1* | 1/2017 | Schnell | G06F 13/4286 |
| 2019/0138489 A1* | 5/2019 | Hundal | G06F 13/4282 |

* cited by examiner

*Primary Examiner* — Jonathan D Gibson
(74) *Attorney, Agent, or Firm* — Kowert, Hood, Munyon, Rankin & Goetzel, P.C.

(57) ABSTRACT

This disclosure relates to techniques and apparatuses for mitigating interference on SuperSpeed (SS) pins of a Universal Serial Bus Type C (USB-C) resulting from wireless communications, such as cellular and/or Wi-Fi communications. Specifically, a USB-C module may determine that a high-speed connection is to be established on the SS pins, and may interrupt the establishment procedure. The USB-C module may then provide an indication or instruction to configure one or more wireless communication modules to mitigate interference with the high-speed connection on the SS pins. For example, the wireless communication modules may be configured to reduce transmit power, cap transmit power, or forego transmission within certain frequency ranges and/or on certain antennas. Once configuration of the wireless communication modules is complete, the USB-C module may resume establishment of the high-speed connection on the SS pins.

20 Claims, 6 Drawing Sheets

CELLULAR-TO-USB AND CELLULAR-TO-DISPLAYPORT SW MITIGATION

FIELD

The present application relates to wireless communications, and more particularly to systems, apparatuses, and methods for mitigating interference on high-speed USB-C pins resulting from wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include LTE, LTE Advanced (LTE-A), NR, HSPA, IEEE 802.11 (WLAN or Wi-Fi™), BLUETOOTH™, etc. Increasingly unified physical connectors also provide high-speed communications options.

The ever-increasing range of features and functionality introduced in wireless communication devices also creates a continuous need for improvement in both wireless communications and in wireless communication devices. In particular, as mobile devices utilize both wired and wireless communications, it is important to ensure that communication controller designs can effectively and efficiently handle that traffic. Accordingly, improvements in the field are desired.

SUMMARY

Embodiments are presented herein of apparatuses, systems, and methods for handling packet discarding in a wireless communication system based on packet importance.

A user equipment (UE) is disclosed, including wireless communication circuitry; a Universal Serial Bus (USB) Type C (USB-C) interface module; and one or more processors configured to cause the UE to perform certain actions. For example, the UE may detect a trigger event, wherein the USB-C interface module is configured to establish a data communication session via SuperSpeed (SS) pins of the USB-C interface module in response to the trigger event. In response to detecting the trigger event, the UE may pause establishment of the data communication session by the USB-C interface module, and configure the wireless communication circuitry to reduce transmit power within one or more frequency ranges to mitigate interference between transmissions of the wireless communication circuitry and the data communication session via the SS pins. In response to completion of configuring the wireless communication circuitry, the UE may complete establishment of the data communication session by the USB-C interface module.

In some scenarios, the wireless communication circuitry may include circuitry for performing cellular communications.

In some scenarios, the wireless communication circuitry may include circuitry for performing Wi-Fi communications.

In some scenarios, configuring the wireless communication circuitry to reduce transmit power within one or more frequency ranges may include applying a maximum transmit power within the one or more frequency ranges.

In some scenarios, configuring the wireless communication circuitry to reduce transmit power within one or more frequency ranges may include foregoing transmission within the one or more frequency ranges.

In some scenarios, detecting the trigger event may include detecting an indication that a remote apparatus connected to the UE via the USB-C interface module is capable of communications via a USB protocol.

In some scenarios, the UE may be acting in a USB host mode, wherein detecting the trigger event may include detecting successful completion of an RX.Detect procedure as defined by a USB protocol.

In some scenarios, the UE may be acting in a USB Alternate Mode to support a DisplayPort protocol, wherein detecting the trigger event may include detecting an indication that an external monitor is connected to the UE via the USB-C interface module and is requesting to receive display data according to the DisplayPort protocol. In some such scenarios, the indication that the external monitor is connected to the UE via the USB-C interface module and is requesting to receive display data according to the DisplayPort protocol may include an indication that a SINK_COUNT value is greater than 0.

A method is disclosed, which may include determining that a Universal Serial Bus (USB) Type C (USB-C) interface module of a user equipment (UE) is physically connected to an external display, and receiving an indication that the external display is requesting to receive display data according to a DisplayPort protocol via the USB-C interface module. The method may further include, in response to receiving the indication, pausing establishment of a DisplayPort connection between the UE and the external display, and configuring one or more wireless communication modules to mitigate interference with the DisplayPort connection and transmission by the one or more wireless communication modules. The method may further include, upon completion of configuring the one or more wireless communication modules, completing establishment of the DisplayPort connection.

In some scenarios, configuring the one or more wireless communication modules to mitigate interference may include reducing transmit power of the one or more wireless communication modules within one or more frequency ranges. In some such scenarios, the one or more frequency ranges may overlap with one or more operating frequencies of the DisplayPort connection. In some such scenarios, the method may further include receiving an indication of the one or more operating frequencies of the DisplayPort connection from the external display via the USB-C interface module.

In some scenarios, configuring the one or more wireless communication modules to mitigate interference may include reducing transmit power of the one or more wireless communication modules on one or more antennas.

In some scenarios, the one or more wireless communication modules may include a cellular communication module and a Wi-Fi communication module, wherein configuring one or more wireless communication modules to mitigate interference includes changing the configuration of both the cellular communication module and the Wi-Fi communication module.

A non-transitory computer-readable memory medium is disclosed, wherein the memory medium may store software instructions executable by a processor to cause the processor to perform certain steps. For example, the processor may provide an indication to a Link Training and Status State Machine (LTSSM) of a Universal Serial Bus (USB) Type C (USB-C) interface module to mask results of an RX.Detect procedure, such that the LTSSM will not change states upon the RX.Detect procedure detecting a connection to a remote apparatus via the USB-C interface module. The processor my also receive an indication that the RX.Detect procedure detected a connection to a remote apparatus via the USB-C interface module. In response to receiving the indication that the RX.Detect procedure detected the connection, the processor may provide an indication to one or more wireless communication modules to mitigate interference with high-speed data pins of the USB-C interface module, and receive an indication that the one or more wireless communication modules have performed configuration to mitigate interference. In response to receiving the indication that the one or more wireless communication modules have performed the configuration, the processor may notify the LTSSM that the RX.Detect procedure detected the connection.

In some scenarios, providing the indication to the LTSSM to mask the results of the RX.Detect procedure may include setting a value in a register accessible to the LTSSM.

In some scenarios, notifying the LTSSM that the RX.Detect procedure detected the connection may include setting a value in a register accessible to the LTSSM.

In some scenarios, providing the indication to the one or more wireless communication modules may include providing information regarding one or more operating frequencies of the high-speed data pins.

In some scenarios, in response to termination of the connection to the remote apparatus via the USB-C interface module, the processor may provide an indication to the one or more wireless communication modules to terminate the mitigation of interference.

A device may include one or more processors configured to perform steps of the preceding methods.

A non-transitory computer-readable storage medium may store software instructions, which, when executed by one or more processors, cause a wireless communication device to perform the steps of any of the preceding methods.

Note that the techniques described herein may be implemented in and/or used with a number of different types of devices, including but not limited to radio access network elements such as base stations, core network elements, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
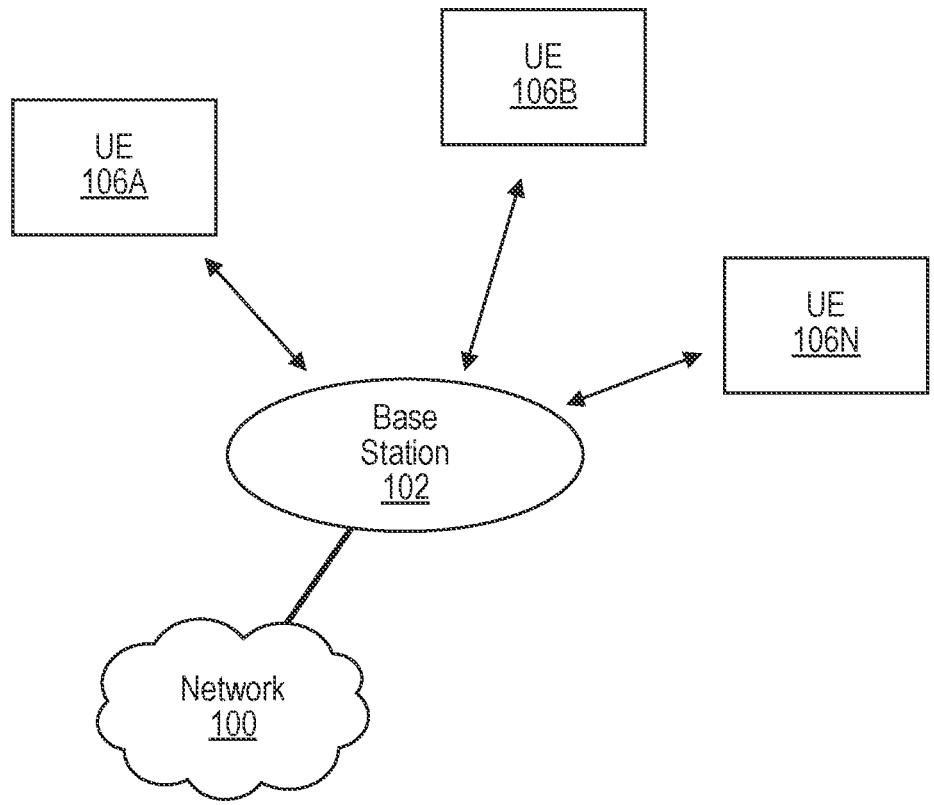
FIG. 1 illustrates an example (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
BS: Base Station
CC: Configuration Channel
LFPS: Low-Frequency Periodic Signaling
LTE: Long Term Evolution
LTSSM: Link Training and Status State Machine.
NR: New Radio
RAT: Radio Access Technology
RF: Radio Frequency
RX: Reception/Receive
SS: SuperSpeed
SW: Software
TRP: Transmission-Reception-Point
TX: Transmission/Transmit
UE: User Equipment
USB: Universal Serial Bus
VBUS: Voltage Bus

Terms

The following is a glossary of terms that may appear in the present disclosure:

Memory Medium-Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium-a memory medium as described above, as well as a physical transmission medium, such as a bus, network, and/or other physical transmission medium that conveys signals such as electrical, electromagnetic, or digital signals.

Computer System (or Computer)-any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")-any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device-any of various types of computer systems or devices that perform wireless communications. A wireless device can be portable (or mobile) or may be stationary or fixed at a certain location. A UE is an example of a wireless device.

Communication Device-any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)-refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well as any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
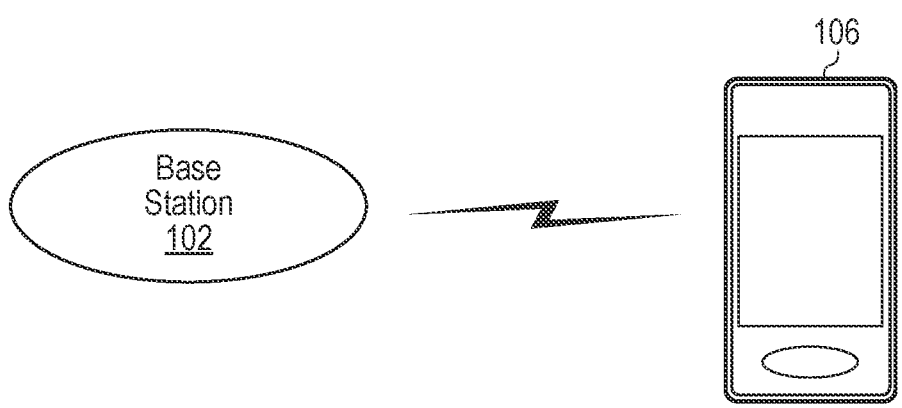
FIG. 2 illustrates an example base station in communication with an example wireless user equipment (UE) device, according to some embodiments.

FIGS. 1 and 2—Example Communication System

FIG. 1 illustrates an example (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the example wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. In some embodiments, it may be possible that the base station 102 includes 3GPP 6th generation (6G) radio access network (RAN) node functionality. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Note that, at least in some 3GPP contexts, base station functionality can be split, for example between any or all of centralized units (CUs), distributed units (DUs), and radio units (RUS). The illustrated base station 102 may support the functionality of any or all of a CU, a DU, or a RU, in such a network deployment context, at least according to some embodiments. In some instances, the base station 102 may be configured to act as an integrated access and backhaul (IAB) donor (e.g., including IAB donor CU and/or IAB donor DU functionality). In some instances, the base station 102 may be configured to act as an IAB node (e.g., including IAB mobile termination (MT) and IAB-DU functionality). Other implementations are also possible.

The base station 102 and the user devices may be configured to communicate over the transmission medium using any of various radio access technologies (RATs), also referred to as wireless communication technologies, or telecommunication standards, such as LTE, LTE-Advanced (LTE-A), LAA/LTE-U, 5G NR, Wi-Fi, etc. In some embodiments, at least some 3GPP 6G based communication techniques may be used to communicate over the transmission medium.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for mitigating interference on high-speed USB-C pins resulting from wireless communications, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an example user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of LTE, LTE-A, 5G NR, Wi-Fi, BLUETOOTH™, or GNSS. In some embodiments, UE 106 may be capable of operating as a 3GPP 6G wireless device, or may potentially be capable of performing at least some 3GPP 6G based communication techniques. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or NR, and separate radios for communicating using each of Wi-Fi and BLUETOOTH™. Other configurations are also possible.

Figure 3:
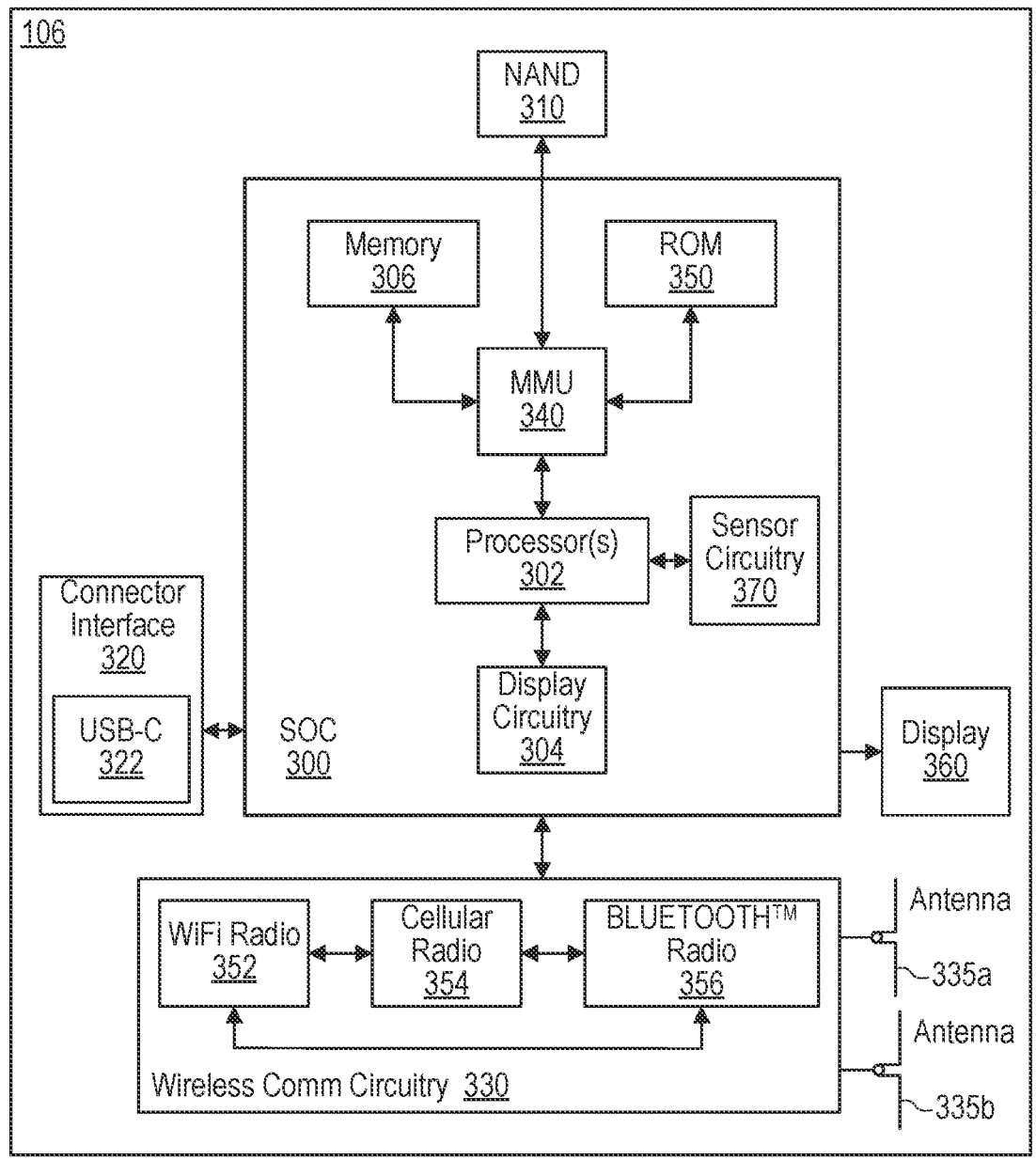
FIG. 3 illustrates an example block diagram of a UE, according to some embodiments.

FIG. 3—Block Diagram of an Example UE Device

FIG. 3 illustrates a block diagram of an example UE 106, according to some embodiments. As shown, the UE 106 may include a system on chip (SOC) 300, which may include portions for various purposes. Some or all of the various illustrated components (and/or other device components not illustrated, e.g., in variations and alternative arrangements) may be "communicatively coupled" or "operatively coupled," which terms may be taken herein to mean components that can communicate, directly or indirectly, when the device is in operation.

As shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry (e.g., radio) 330, connector interface 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320, the display 360, and wireless communication circuitry 330 (e.g., for LTE, LTE-A, NR, BLUETOOTH™, Wi-Fi, GPS, etc.). In some embodiments, UE 106 may be capable of operating as a 3GPP 5G wireless device, or may potentially be capable of performing at least some 3GPP 5G based communication techniques. The UE device 106 may include or couple to at least one antenna (e.g., 335*a*), and possibly multiple antennas (e.g., illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of wireless communication circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

In some embodiments, wireless communication circuitry 330 may include separate controllers dedicated to controlling communications for various respective RAT standards. For example, as shown in FIG. 3, wireless communication circuitry 330 may include a Wi-Fi radio 352, a cellular radio (e.g., LTE and/or NR radio) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). While three separate controllers are illustrated within wireless communication circuitry 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular radio 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

The connector interface 320 may include hardware and/or control modules to connect the UE 106 to one or more external devices, such as an external power source, a computer system, dock, peripheral device, etc. For example, the connector interface 320 may include a USB-C module 322, which may include a physical USB-C receptacle and an associated controller, including any of dedicated hardware, software, state machines, etc., for configuring, managing, and executing communications according to USB protocols. The connector interface 320 may additionally, or alternatively, include similar modules for other interface types, such as Lightning, audio I/O, etc.

The UE 106 may include hardware and software components for implementing methods for the UE 106 to perform techniques for mitigating interference on high-speed USB-C pins resulting from wireless communications, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for mitigating interference on high-speed USB-C pins resulting from wireless communications according to various embodiments disclosed herein. Processor(s) 302 may also implement various other applications and/or end-user applications running on UE 106.

Figure 4:
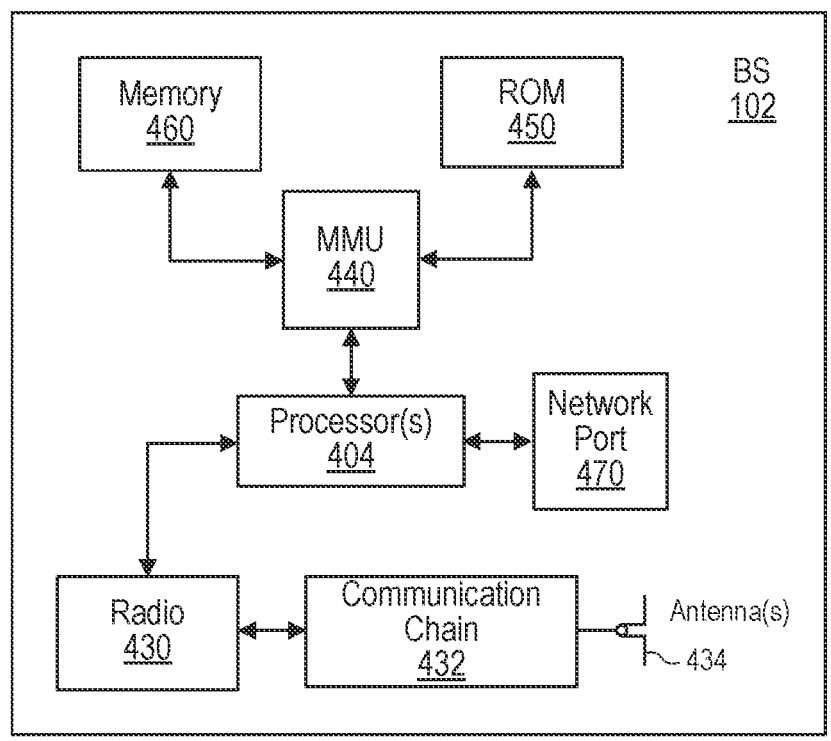
FIG. 4 illustrates an example block diagram of a base station, according to some embodiments.

FIG. 4—Block Diagram of an Example Base Station

FIG. 4 illustrates a block diagram of an example base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs. In some embodiments, base station 102 may be capable of operating as a 3GPP 6G radio access network node, or may potentially be capable of performing at least some 3GPP 6G based communication techniques.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

RF Mitigation for SS Communications

Universal Serial Bus (USB) is an industry standard that specifies the physical interfaces and protocols for connecting, data transferring, and powering of hosts, peripherals, and intermediate hubs. The protocols and connectors used to implement USB are defined by the USB Implementers Forum (USB-IF). USB Type-C(USB-C) is a 24-pin serial connector system for use with USB protocols. The USB-C connector has a small form factor, making its use practical for facilitating USB communications with mobile devices, such as cellular telephones, tablets, etc., some of which may also use wireless communication protocols, such as Wi-Fi, LTE, 5G, Bluetooth, ultra-wideband (UWB), etc.

Recent USB protocols include support for communications via 4 differential pairs of high-frequency data pins referred to as SuperSpeed (SS) pins of a USB-C connector. Reference herein to a "pin" should be understood to include the wire or other electrically conductive medium connected to the pin for conducting electricity and/or electromagnetic signals via the pin. These SS pins allow transfer of data at high data rates, such as 5 Gbps. 10 Gbps, or 20 Gbps. In some scenarios, data transfers via the SS pins may operate at frequencies that experience interference from wireless communication, such as 5G and/or Wi-Fi operating in the 5 GHz range. Methods and apparatuses for mitigating such interference are presented herein.

In general, interference may be mitigated by a communication apparatus, such as the UE 106, by recognizing that SS communications are about to begin, and pausing the SS setup procedure while reconfiguring one or more wireless communication modules to reduce or prevent operations that are likely to interfere. For example, a wireless communication module may reconfigure a wireless communication module to reduce or eliminate transmit power within certain frequency ranges and/or on certain antennas. Once reconfiguration of the one or more wireless communication modules is complete, the communication apparatus may resume the SS setup procedure. Details regarding how this procedure is implemented may vary depending on a number of factors, such as a communication protocol being used and/or a communication role of the communication apparatus.

For example, a communication apparatus may connect via USB connection to another apparatus as either a "host" or a "device," e.g., when a USB cable is connected to each of the apparatuses. The host may initiate and/or control certain interactions between the two apparatuses. A device may perform a different procedure to mitigate interference from wireless communications than a host.

As another example, a communication apparatus may utilize a particular communication protocol, such as DisplayPort, over the SS pins. Using such a communication protocol may involve additional control signaling that may impact the mitigation procedure.

Figure 5:
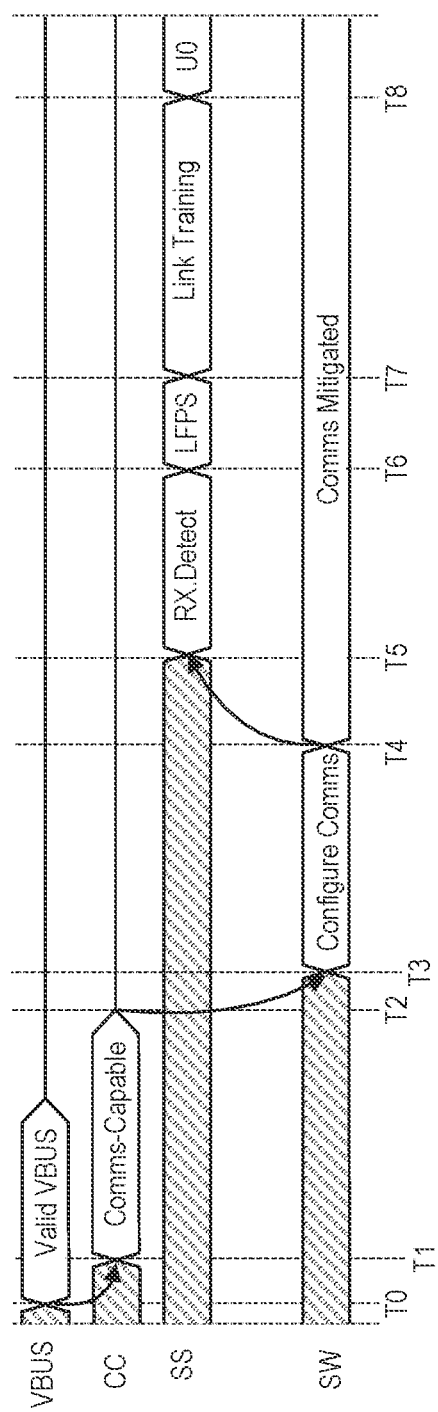
FIG. 5 illustrates an example flow diagram of a procedure for an apparatus in "device" mode to mitigate wireless communication interference with data communications on the SuperSpeed (SS) pins, according to some embodiments.
Figure 6:
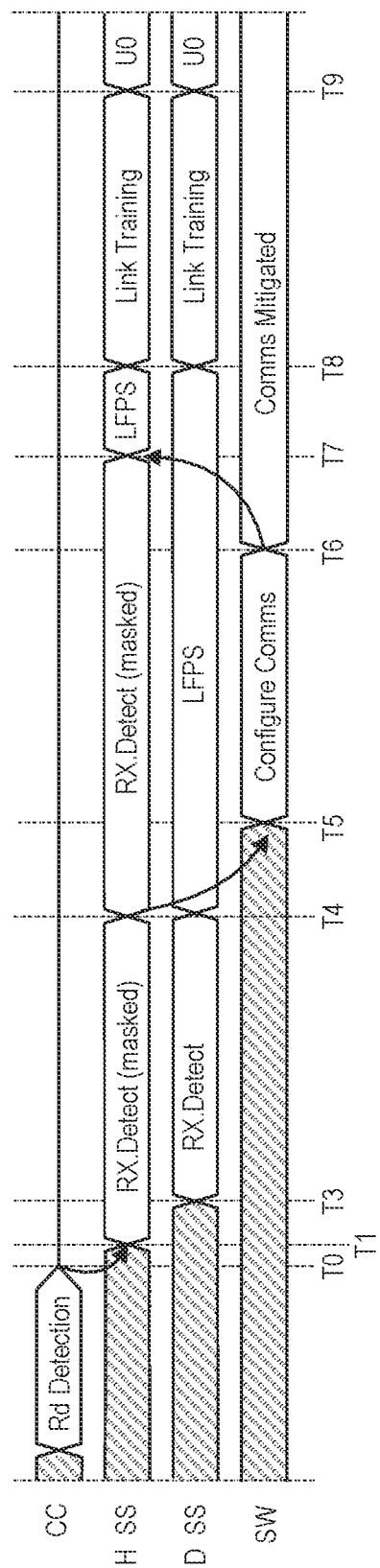
FIG. 6 illustrates an example flow diagram of a procedure for an apparatus in "host" mode to mitigate wireless communication interference with data communications on the SS pins, according to some embodiments.
Figure 7:
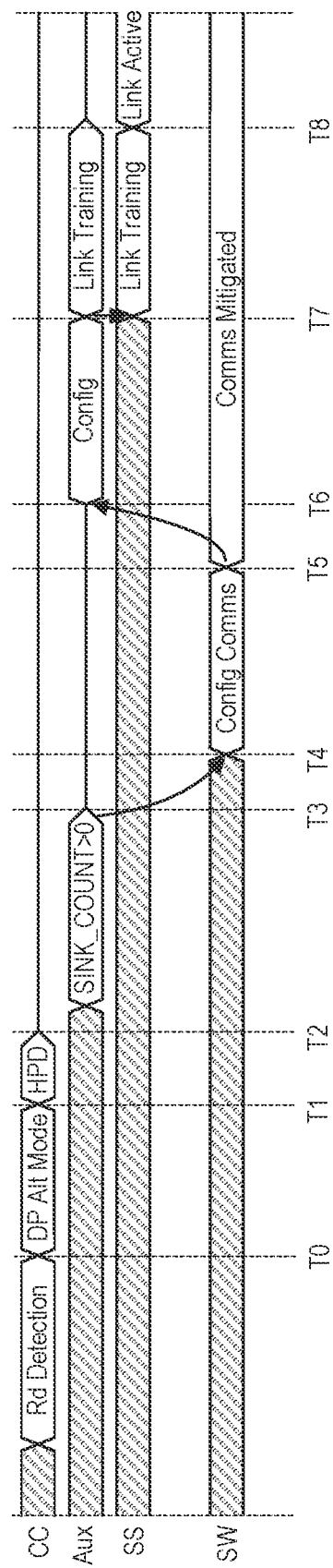
FIG. 7 illustrates an example flow diagram of a procedure for an apparatus to mitigate wireless communication interference with DP data communications on the SS pins of a USB-C connection, according to some embodiments.

Examples of possible implementations based on these factors are illustrated in FIGS. 5-7.

FIG. 5—RF Mitigation for USB Device Mode

FIG. 5 illustrates an example flow diagram of a procedure for an apparatus in "device" mode to mitigate wireless communication interference with data communications on the SS pins. The steps illustrated in FIG. 5 may be performed by an apparatus capable of communicating as a device via a USB-C connection, such as the UE 106.

FIG. 5 illustrates a voltage bus (VBUS) line, a configuration channel (CC) line, a SuperSpeed (SS) line, and a software (SW) line. Each line may represent a functional entity within the apparatus, such as one or more differential pairs of pins on the USB-C connector or a software module of the apparatus. For example, VBUS may represent some or all of two pairs of pins that carry power on the USB-C connector. CC may represent one or more of a pair of pins (CC1 and CC2) that perform a number of functions, such as cable attachment and removal detection, receptacle/plug orientation detection, current advertisement, and/or discovering and configuring optional Alternate and Accessory modes. SS may represent the SS pins as discussed above. SW may represent a software module for controlling one or more wireless communication modules. For example, SW may include control software for controlling the wireless communication circuitry 330. More specifically SW may include software for controlling the Wi-Fi radio 352 for configuring and managing Wi-Fi communications and hardware; and/or software for controlling the cellular radio 354 for configuring and managing cellular communications and hardware.

As illustrated in FIG. 5, at time T0, the apparatus may detect power on the VBUS line, indicating that the USB-C receptacle has been connected to a host or power source, and that the apparatus will act in device mode. For example, the apparatus may determine that a certain minimum voltage level is present on the VBUS line. In response, the apparatus may, at time T1, begin to monitor the CC line for an indication that the connected apparatus is capable of communicating via a USB protocol. At T2, the apparatus may determine that the CC line carries such an indication. For example, the apparatus may detect a Comms-Capable signal on the CC line.

Typically, detection of the Comms-Capable signal will cause a management module such as the USB Link Training and Status State Machine (LTSSM) to initiate establishment of the SS lines as a device. Specifically, the LTSSM may implement the RX.Detect procedure, which includes applying a resistive termination to ground on its SS receive pins and monitoring for a resistive termination to ground on the far end of its SS transmit pins. Detecting the presence of the resistive termination on the far end of its SS transmit pins indicates that the pins are properly connected to the remote apparatus, and represents successfully completing the RX.Detect procedure. Upon completion of RX.Detect, the apparatus may proceed with link training and data transfer.

However, in the scenario illustrated in FIG. 5, the apparatus may interrupt this typical flow. Specifically, a USB software control module (e.g., a software control module of the USB-C module 322) may delay providing to the LTSSM a trigger to cause the LTSSM to enter the RX.Detect state. Further, the USB software control module may communicate with the SW, rather than proceeding with RX.Detect, upon detection of the Comms-Capable signal. The USB software control module may provide an indication to the SW that SS communications are imminent, to cause the SW to limit potentially interfering wireless communications. Alternatively, or additionally, the USB software control module may provide specific instructions to the SW to limit the communications, which may, in some scenarios, include information regarding which communications to limit.

In some scenarios, the information or instruction may be provided by setting a value in a register accessible to the SW. Alternatively, the USB software control module may communicate directly with the SW.

In response to the indication or instruction from the USB software control module, SW may, at T3, configure one or more wireless communication modules to limit potentially interfering communications. For example, SW may include a cellular control module, which may configure the cellular radio 354 to reduce operation within relevant frequency ranges. For example, the SW may configure the cellular radio 354 to reduce transmit power on one or more relevant frequencies, e.g., by a fixed amount, a scaled amount, or a percentage. As another example, the SW may configure the cellular radio 354 to cap transmit power (e.g., enforce a maximum transmit power limit) on one or more relevant frequency ranges. As another example, the SW may configure the cellular radio 354 to forego transmission on one or more relevant frequency ranges.

As another example, the SW may include a Wi-Fi control module, which may configure the Wi-Fi radio 352 to reduce operation within the relevant frequency ranges. In some scenarios, the SW may configure both the cellular radio 354 and the Wi-Fi radio 352 to reduce operation within the relevant frequency ranges.

The relevant frequency ranges may be known in advance to the SW or may be communicated by the USB software control module, or may be determined by the SW based on information provided by the USB software control module. For example, the USB software control module may provide information regarding one or more frequencies or frequency ranges to be used on the SS lines, and the SW may determine the frequency ranges relevant to those frequencies or frequency ranges, e.g., using a lookup table. The relevant frequencies may differ, e.g., depending on a USB protocol being used (e.g., USB2 or USB3), the frequency at which the SS lines are operating, the wireless communication technology to be mitigated, etc.

Upon completion of the configuration of the one or more wireless communication modules to limit potentially interfering communications, the SW may, at T4, indicate to the USB software control module that the configuration is complete. For example, the SW may set a value in a register accessible to both the SW and the USB software control module. As another example, the SW may communicate directly with the USB software control module.

In response to receiving the indication that the configuration is complete, the USB software control module may, at T4, resume normal SS setup by causing the LTSSM to transition to the RX.Detect state and implement the RX.Detect procedure. Upon successful completion of the RX.Detect procedure, the LTSSM may begin low-frequency periodic signaling (LFPS) at T6, perform link training at T7, and proceed with active data transfer on the SS line in the U0 state starting at T8.

In some scenarios, the interference mitigation may continue until the USB connection is terminated. For example, when the USB connection is broken (e.g., when an external USB cable is removed from the USB-C interface module), the USB software control module (or some other software module) may provide an indication to the SW. In response, the SW may configure the one or more wireless communication modules to remove the power constrains previously applied to mitigate interference on the SS line.

It should be understood that references to steps performed by the USB software control module or LTSSM may, in some implementations, be performed by other entities configured to perform a similar role. Similarly, it should be understood that references to cellular or Wi-Fi communications are merely examples, and the flow illustrated in FIG. 5 may be applied to any radio access technology involving wireless communications that may predictably cause interference with SS communications, e.g., because they operate at similar frequencies, harmonic frequencies, etc.

FIG. 6—RF Mitigation for USB Host Mode

FIG. 6 illustrates an example flow diagram of a procedure for an apparatus in "host" mode to mitigate wireless communication interference with data communications on the SS pins. The steps illustrated in FIG. 6 may be performed by an apparatus capable of communicating as a host via a USB-C connection, such as the UE 106. An apparatus operating in host mode must comply with certain timing constraints that do not apply to an apparatuse operating in device mode. The procedure for mitigating wireless communication interference is therefore somewhat different.

FIG. 6 illustrates a CC line, a host-side SS line (H SS), a device-side SS line (D SS) and a SW line. Each of the CC, H SS, and SW lines may represent a functional entity within the apparatus, similar to those of FIG. 5. The D SS line may represent the SS pins at a connected apparatus operating in device mode, and is included to further clarify operations between the two apparatuses.

As illustrated in FIG. 6, at time T0, the apparatus may detect the presence of a USB connection by Rd detection, as specified in USB protocols. In response, the apparatus, acting as the host, may apply a voltage on the VBUS line (not shown in FIG. 6) and/or provide a Comms-Capable signal, such that the remote device-mode apparatus may detect these signals, as shown in FIG. 5. The apparatus may also, at T1, cause the LTSSM to implement the RX.Detect procedure.

As in the scenario of FIG. 5, a traditional procedure may be for the LTSSM of the apparatus to transition to LFPS, link training, and U0 upon completion of RX.Detect. Also as in the scenario of FIG. 5, the behavior of the LTSSM may be modified to pause normal operation of the SS setup procedure, to allow the SW to configure one or more wireless communication modules to mitigate interference. However, for a host, pausing the SS setup procedure before initiation of RX.Detect may introduce complications.

Specifically, the LTSSM of a host, having entered the RX.Detect state, should continue performing the RX.Detect procedure indefinitely, until the procedure is successfully completed or the connection is broken. However, for an apparatus in device mode, the LTSSM is required to remain in the RX.Detect state for only 84 ms. If that time expires without successful completion of the RX.Detect procedure, then the LTSSM may transition to an SS.Disabled state and abandon the SS setup procedure. As shown on the D SS line, the device may, at T3, initiate RX.Detect, e.g., in response to receiving a Comms-Capable signal, thus beginning the 84 ms timeout window.

The LTSSM may have little or no control over the time the SW takes to perform its mitigation configuration. Thus, if the host were to delay performing RX.Detect while performing the wireless communication configuration, it may fail to perform the RX.Detect procedure within the specified 84 ms timeout window. Additionally, the host will not receive a Comms-Capable signal from the device, so successful completion of the RX.Detect procedure may be the first point at which the host receives confirmation that the device is capable of performing communications on the SS line.

Thus, in the scenario of FIG. 6, the LTSSM may implement the RX.Detect procedure at T1 and may pause the procedure to allow mitigation configuration at a later point. Specifically, the behavior of the LTSSM may be modified to pause normal operation of the SS setup procedure upon successful RX.Detect. For example, the USB software control module may modify a register or provide some other indication to cause the LTSSM to trigger an interrupt upon successful completion of RX.Detect at T4 (e.g., by detecting a resistive load at the far end of its SS transmit pins), before transitioning to LFPS. Thus, the LTSSM may pause operation or may remain in the RX.Detect state. Alternatively, the USB software control module may determine successful completion of RX.Detect at T4, and may mask the result, so that the LTSSM is not aware of the successful completion, and therefore remains in the RX.Detect state. In either case, the USB software control module may respond to the successful RX.Detect by providing to the SW an indication that SS communications are imminent, to cause the SW to limit potentially interfering wireless communications. Alternatively, or additionally, the USB software control module may provide specific instructions to SW to limit the communications, which may, in some scenarios, include information regarding which communications to limit.

In some scenarios, the information or instruction may be provided by setting a value in a register accessible to both the USB software control module and the SW. Alternatively, the USB software control module may communicate directly with the SW.

In response to the indication or instruction from the USB software control module, SW may, at T5, configure one or more wireless communication modules to limit potentially interfering communications, e.g., substantially as described in connection with FIG. 5. For example, SW may reduce transmit power and/or forego transmission within relevant frequency ranges for cellular and/or Wi-Fi communications.

It may be noted that the device may also determine successful completion of RX.Detect, e.g., at or near T4. In response, the device may transition to LFPS. This may be advantageous because LFPS has a 360 ms timeout window. Further, LFPS is commonly completed within only a small portion of the timeout window-commonly on the order of 0.1 ms. Thus, the host may utilize close to 360 ms for mitigation configuration of the wireless modules without causing failure of the SS setup procedure. In many implementations, mitigation configuration may be expected to be completed in far less time, such as 100 ms or 25 ms.

Upon completion of the configuration of the one or more wireless communication modules to limit potentially interfering communications, the SW may, at T6, indicate to the USB software control module that the configuration is complete. For example, the SW may set a value in a register accessible to both the SW and the USB software control module. As another example, the SW may communicate directly with the USB software control module.

In response to receiving the indication that the configuration is complete, the USB software control module may cause the LTSSM to resume normal SS setup by proceeding to LFPS at T7, perform link training at T8, and proceed with active data transfer on the SS line in the U0 state starting at T9.

It should be understood that references to steps performed by the USB software control module or the LTSSM may, in some implementations, be performed by other entities configured to perform a similar role. Similarly, it should be understood that references to cellular or Wi-Fi communications are merely examples, and the flow illustrated in FIG. 6 may be applied to any radio access technology involving wireless communications that may predictably cause interference with SS communications, e.g., because they operate at similar frequencies, harmonic frequencies, etc.

FIG. 7—RF Mitigation for DisplayPort Communications

USB-C provides for use of a connection with an Alternate Mode to implement communications according to other established protocols. An example of such a supported protocol is DisplayPort (DP) Alternate Mode. DP is a digital display interface standardized by the Video Electronics Standards Association (VESA). Although DP traditionally used a dedicated interface port, it is now also supported by Alternate Mode via USB-C. Specifically, an apparatus such as the UE 106 may provide output data for an external display using DP via a USB-C connection, with the apparatus acting as host and the display acting as a device.

Interference on the SS lines by wireless communications, while the SS lines are carrying DP data may result in visible image artifacts on the external display, or may even cause the DP link to drop, which may cause the display to go black. Mitigation of such interference is therefore important.

FIG. 7 illustrates an example flow diagram of a procedure for an apparatus to mitigate wireless communication interference with DP data communications on the SS pins of a USB-C connection. The steps illustrated in FIG. 7 may be performed by an apparatus capable of communicating as a host via a USB-C connection, such as the UE 106. Because implementation of DP in Alternate Mode involves additional signaling, the procedure for mitigating wireless communication interference is somewhat different than that illustrated in FIG. 6.

FIG. 7 illustrates a CC line, an Auxiliary (Aux) line, a SS line, and a SW line. Each line may represent a functional entity within the apparatus, such as one or more differential pairs of pins on the USB-C connector or a software module of the apparatus, such as those described above. The Aux line may represent an abstraction of a data line present on a traditional DP connection. In the scenario of FIG. 7, the Aux line may represent DP information that would traditionally have been passed via the DP Aux line, but which is implemented via the USB-C connection as packetized information carried via the Sideband Use (SBU) pins. Specifically, the SBU pins are a pair of low-speed signal paths that are used only in the Alternate Mode.

As illustrated in FIG. 7, at time T0, the apparatus may detect the presence of a USB connection by Rd detection, as specified in USB protocols. At T1, the apparatus may further detect an indication that the connection should operate according to DP Alternate Mode. At T2, the apparatus may detect a Hot Plug Detect (HDP) indication, which is a DP protocol indication that a remote device has been connected via a DP connection.

In response to the HPD indication, a software control module of the apparatus (e.g., the USB software control module and/or a software control module for a DP interface) may monitor the Aux line for further information. At T3, the software control module may detect an indication on the Aux line that SINK_COUNT is greater than 0. This is a DP protocol signal indicating that a DP sink (e.g., an external monitor) is connected and is requesting to receive display data.

A traditional procedure may be for the software control module to respond to the indication on the Aux line that SINK_COUNT is greater than 0 by configuring a DP data connection between the apparatus and the sink, performing link training, and beginning data communication. However, in the scenario of FIG. 7, this behavior may be modified to pause normal setup of the DP connection, to allow the SW to configure one or more wireless communication modules to mitigate interference.

Specifically, the indication on the Aux line that SINK_COUNT is greater than 0 provides a clear flag that the apparatus will be attempting to establish DP communications over the SS line. Thus, the software control module may respond to the indication that SINK_COUNT is greater than 0 by pausing the DP setup procedure and provide to the SW an indication that SS communications are imminent, to cause the SW to limit potentially interfering wireless communications. Alternatively, or additionally, the software control module may provide specific instructions to SW to limit the communications, which may, in some scenarios, include information regarding which communications to limit.

In some scenarios, the information or instruction may be provided by setting a value in a register accessible to both the software control module and the SW. Alternatively, the software control module may communicate directly with the SW.

In response to the indication or instruction from the software control module, SW may, at T4, configure one or more wireless communication modules to limit potentially interfering communications, e.g., substantially as described in connection with FIG. 5. For example, SW may reduce transmit power and/or forego transmission within relevant frequency ranges for cellular and/or Wi-Fi communications.

The relevant frequency ranges to be mitigated may be known in advance to the SW or may be communicated by the software control module, or may be determined by the SW based on information provided by the USB software control module. For example, the software control module for the DP interface may receive information, e.g., via the Aux line, regarding one or more DP connection rates supported by the sink (e.g., reduced bit rate (RBR), high bit rate (HBR), HBR2, HBR3, etc.) and may provide this information to the SW, which may determine the frequency ranges relevant to those connection rates, e.g., using a lookup table. In some scenarios, the DP connection rates supported by the sink may have been communicated to the apparatus previously, e.g., via the Aux line.

Upon completion of the configuration of the one or more wireless communication modules to limit potentially interfering communications, the SW may, at T5, indicate to the software control module that the configuration is complete. For example, the SW may set a value in a register accessible to both the SW and the software control module. As another example, the SW may communicate directly with the software control module.

In response to receiving the indication that the configuration of the wireless communication modules is complete, the software control module may resume the DP setup procedure by initiating a DP link configuration procedure at T6. After completion of the configuration procedure, the software control module may initiate DP link training on the Aux line and SS link training on the SS line at T7. Upon completion of the link training, the DP link may be active via the SS lines, and DP data communications may begin at T8.

It should be understood that references to steps performed by the software control module may, in some implementations, be performed by other entities configured to perform a similar role. Similarly, it should be understood that references to cellular or Wi-Fi communications are merely examples, and the flow illustrated in FIG. 7 may be applied to any radio access technology involving wireless communications that may predictably cause interference with DP data communications, e.g., because they operate at similar frequencies, harmonic frequencies, etc.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A user equipment (UE) comprising:
wireless communication circuitry;
a Universal Serial Bus (USB) Type C (USB-C) interface module; and
one or more processors configured to cause the UE to:
detect a trigger event, wherein the USB-C interface module is configured to establish a data communication session via SuperSpeed (SS) pins of the USB-C interface module in response to the trigger event;
in response to detecting the trigger event:
pause establishment of the data communication session by the USB-C interface module; and
configure the wireless communication circuitry to reduce transmit power within one or more frequency ranges to mitigate interference between transmissions of the wireless communication circuitry and the data communication session via the SS pins; and
in response to completion of configuring the wireless communication circuitry, complete establishment of the data communication session by the USB-C interface module.

2. The UE of claim 1, wherein the wireless communication circuitry comprises circuitry for performing cellular communications.

3. The UE of claim 1, wherein the wireless communication circuitry comprises circuitry for performing Wi-Fi communications.

4. The UE of claim 1, wherein configuring the wireless communication circuitry to reduce transmit power within one or more frequency ranges comprises applying a maximum transmit power within the one or more frequency ranges.

5. The UE of claim 1, wherein configuring the wireless communication circuitry to reduce transmit power within one or more frequency ranges comprises foregoing transmission within the one or more frequency ranges.

6. The UE of claim 1, wherein detecting the trigger event comprises:
detecting an indication that a remote apparatus connected to the UE via the USB-C interface module is capable of communications via a USB protocol.

7. The UE of claim 1, wherein the UE is acting in a USB host mode, wherein detecting the trigger event comprises:
detecting successful completion of an RX.Detect procedure as defined by a USB protocol.

8. The UE of claim 1, wherein the UE is acting in a USB Alternate Mode to support a DisplayPort protocol, wherein detecting the trigger event comprises:
detecting an indication that an external monitor is connected to the UE via the USB-C interface module and is requesting to receive display data according to the DisplayPort protocol.

9. The UE of claim 8, wherein the indication that the external monitor is connected to the UE via the USB-C interface module and is requesting to receive display data according to the DisplayPort protocol comprises an indication that a SINK_COUNT value is greater than 0.

10. A method, comprising:
determining that a Universal Serial Bus (USB) Type C (USB-C) interface module of a user equipment (UE) is physically connected to an external display;
receiving an indication that the external display is requesting to receive display data according to a DisplayPort protocol via the USB-C interface module;
in response to receiving the indication:
pausing establishment of a DisplayPort connection between the UE and the external display; and
configuring one or more wireless communication modules to mitigate interference with the DisplayPort connection and transmission by the one or more wireless communication modules; and
upon completion of configuring the one or more wireless communication modules, completing establishment of the DisplayPort connection.

11. The method of claim 10, wherein configuring the one or more wireless communication modules to mitigate interference comprises reducing transmit power of the one or more wireless communication modules within one or more frequency ranges.

12. The method of claim 11, wherein the one or more frequency ranges overlap with one or more operating frequencies of the DisplayPort connection.

13. The method of claim 12, further comprising receiving an indication of the one or more operating frequencies of the DisplayPort connection from the external display via the USB-C interface module.

14. The method of claim 10, wherein configuring the one or more wireless communication modules to mitigate interference comprises reducing transmit power of the one or more wireless communication modules on one or more antennas.

15. The method of claim 10, wherein the one or more wireless communication modules comprise a cellular communication module and a Wi-Fi communication module, wherein configuring one or more wireless communication modules to mitigate interference includes changing the configuration of both the cellular communication module and the Wi-Fi communication module.

16. A non-transitory computer-readable memory medium storing software instructions executable by a processor to cause the processor to:
 provide an indication to a Link Training and Status State Machine (LTSSM) of a Universal Serial Bus (USB) Type C (USB-C) interface module to mask results of an RX.Detect procedure, such that the LTSSM will not change states upon the RX.Detect procedure detecting a connection to a remote apparatus via the USB-C interface module;
 receive an indication that the RX.Detect procedure detected a connection to a remote apparatus via the USB-C interface module;
 in response to receiving the indication that the RX.Detect procedure detected the connection, provide an indication to one or more wireless communication modules to mitigate interference with high-speed data pins of the USB-C interface module;
 receive an indication that the one or more wireless communication modules have performed configuration to mitigate interference; and
 in response to receiving the indication that the one or more wireless communication modules have performed the configuration, notify the LTSSM that the RX.Detect procedure detected the connection.

17. The non-transitory computer-readable memory medium of claim 16, wherein providing the indication to the LTSSM to mask the results of the RX.Detect procedure comprises setting a value in a register accessible to the LTSSM.

18. The non-transitory computer-readable memory medium of claim 16, wherein notifying the LTSSM that the RX.Detect procedure detected the connection comprises setting a value in a register accessible to the LTSSM.

19. The non-transitory computer-readable memory medium of claim 16, wherein providing the indication to the one or more wireless communication modules comprises providing information regarding one or more operating frequencies of the high-speed data pins.

20. The non-transitory computer-readable memory medium of claim 16, wherein the software instructions are further executable to:
 in response to termination of the connection to the remote apparatus via the USB-C interface module, provide an indication to the one or more wireless communication modules to terminate the mitigation of interference.

* * * * *